United States Patent Office 3,277,832
Patented Oct. 11, 1966

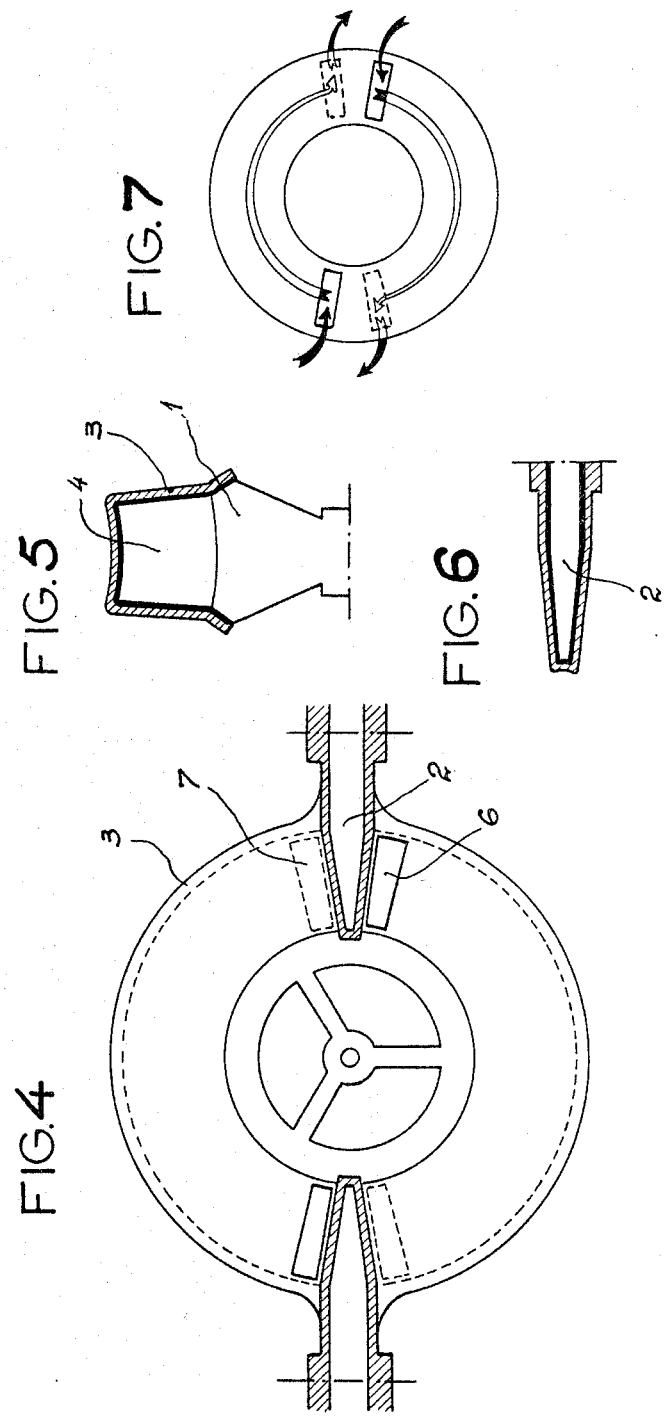

3,277,832
ROTARY APPARATUS WITH MOVABLE ELEMENTS ENABLING A FLUID OR FLUIDIZED SOLID TO BE COMPRESSED EXPANDED OR DRIVEN
Marcel Louis Panie-Dujac, 4 rue Vercingetorix, Paris, France
Filed July 1, 1964, Ser. No. 379,573
Claims priority, application France, July 17, 1963, 941,765, Patent 1,370,790
5 Claims. (Cl. 103—125)

The invention relates to rotary apparatus with movable elements enabling a fluid or fluidized solid to be compressed, expanded or driven.

Known rotary apparatus such as pumps, compressors and turbines, are generally actuated by a fluid in movement acting on, or being acted upon, by paddles or fins on a rotary member in a stationary housing. In such apparatus the inlet and outlet orifices for the fluids are not separated by fluid-tight members, and the conversion of the energy of the moving fluid into mechanical energy or vice versa takes place with a relatively low yield, the difference in fluid pressure between the inlet and outlet orifices being only partially utilized.

The apparatus according to the invention comprises rotary elements mounted in a stationary housing in which the fluid is circulated between the rotary elements and the housing.

According to one feature of the invention, the circular paths travelled by the rotary elements overlap and the overlapping area is constantly occupied by one or the other of the rotary elements.

According to another feature of the invention, the inlet and outlet orifices provided in the housing for the fluids are either constantly or intermittently separated from one another by an impermeable barrier constituted by one or the other of the rotary elements.

Further, according to the invention, the rotary elements allow either the fluids to be compressed, expanded or driven or the energy of a fluid in movement or under pressure to be converted into mechanical energy.

In accordance with the invention one of the rotary elements advantageously comprises a finned wheel rotating in the stationary housing, the fins acting as the pistons to move, or be moved by, the fluid, and the other rotary elements comprise discs rotating in the housing about shafts perpendicular to the axis of rotation of the finned wheel.

Figure 1:
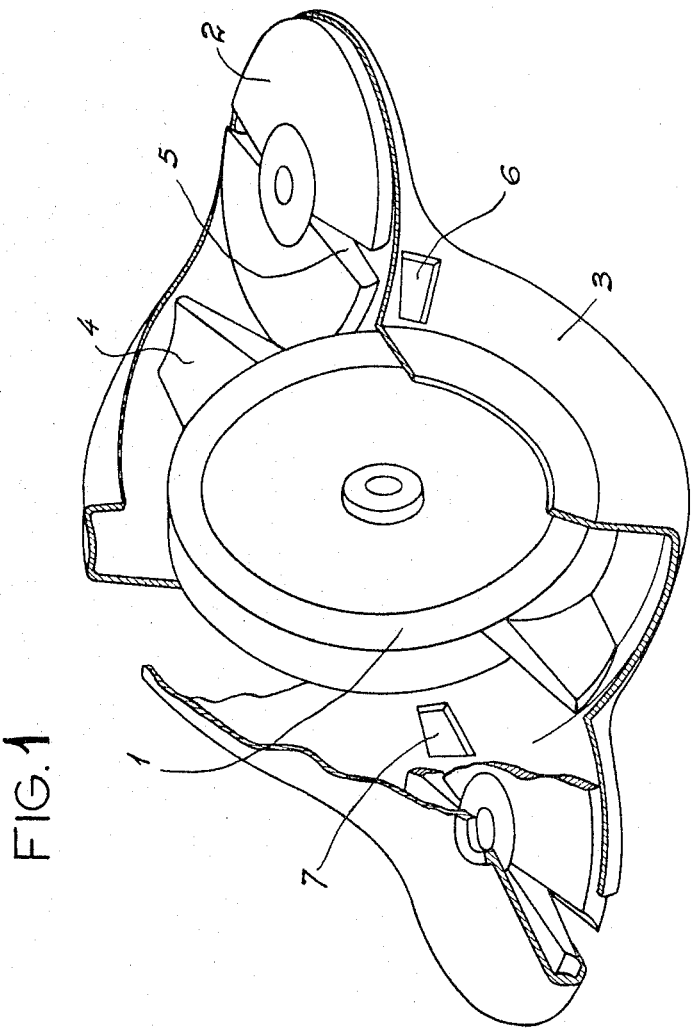
Figure 9:
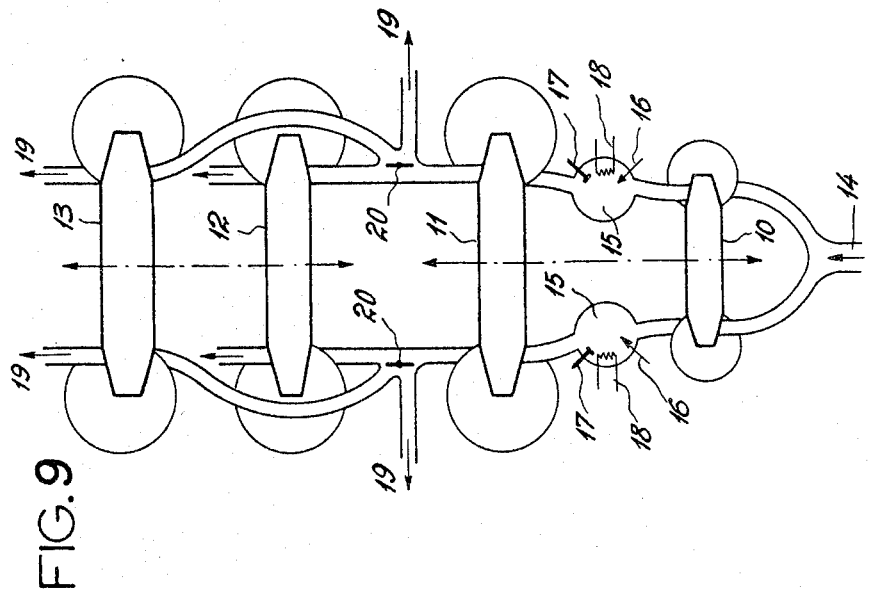
Figure 3:
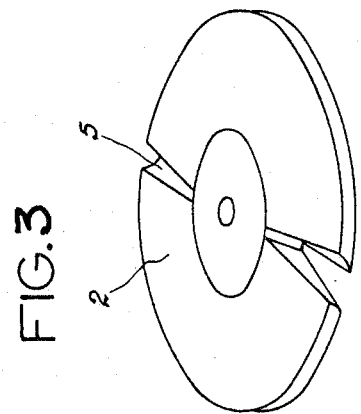
Figure 2:
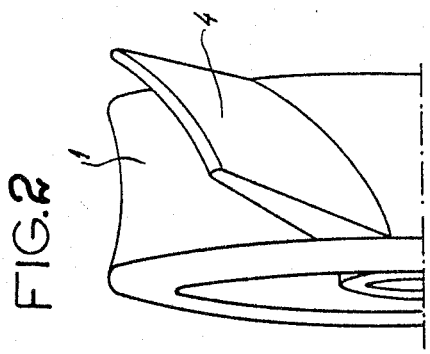
Figure 8:
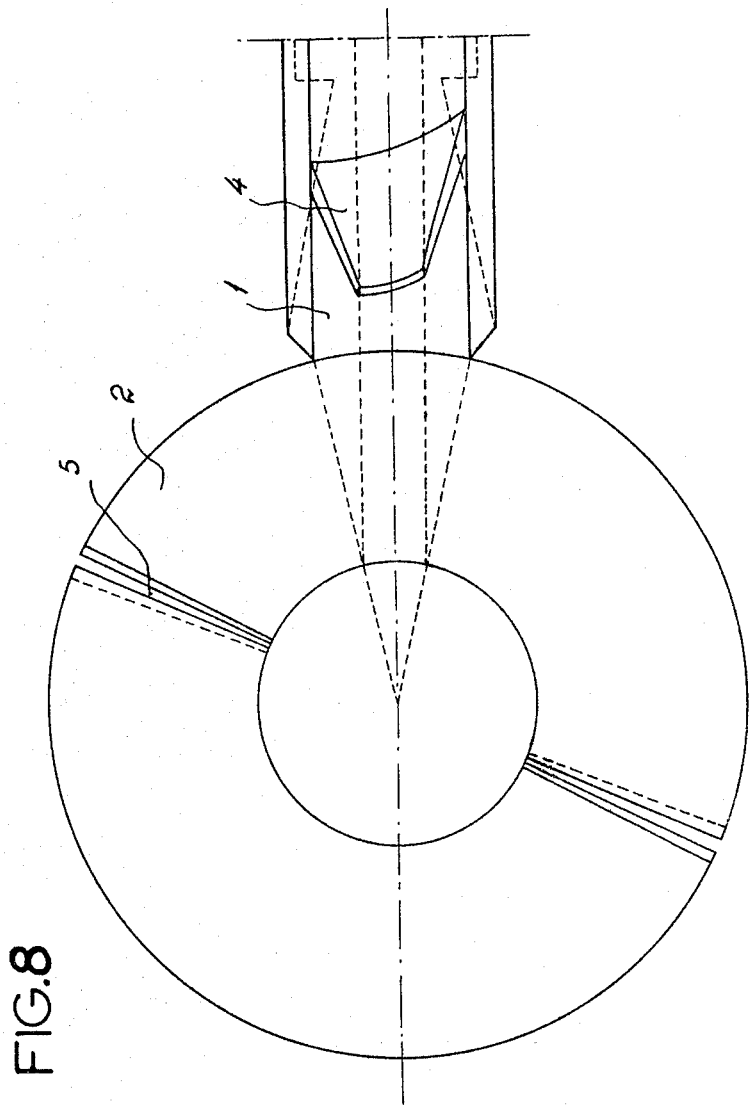

An embodiment of an apparatus according to the invention, given as a non-restrictive example, will be described with reference to the accompanying drawings, in which:

FIG. 1 is a perspective view of the apparatus according to the invention with part of the housing broken away, FIG. 2 is a perspective view of half the finned wheel of the apparatus, FIG. 3 is a perspective view of a distributing disc in the apparatus, FIG. 4 is a section through the apparatus according to the invention taken perpendicularly to the axis of the finned wheel, FIG. 5 is an axial section through half the finned wheel, FIG. 6 is an axial section through half a distributing disc, FIG. 7 is a diagrammatic elevational view illustrating the circulation of fluids in the apparatus, FIG. 8 is a plan view of a distributing disc and of the finned wheel illustrating the relative positions of these two members, and FIG. 9 is a diagrammatic view of an assembly of several pieces of apparatus according to the invention grouped so as to form a motor assembly.

With reference to FIG. 1, the apparatus according to the invention comprises a finned wheel 1 and two distributing discs 2 rotatably mounted in a housing 3.

The wheel 1 is rotatably mounted on a shaft (not shown) and carries at its periphery two fins 4 which are symmetrically arranged on opposite sides of the wheel 1. The two fins are set at an angle relative to the rotational axis of the wheel. Sections through the rim of the wheel 1 and through the fins 4 in an axial plane (FIG. 5) show convex curves directed towards the center of the wheel 1; the centers of curvature of the rim of the wheel 1 and the tip of the fins 4 coincide with the axis of rotation of the discs 2. The fins may be inclined at any desirable angle relative to the plane perpendicular to the shaft of the wheel 1.

The two discs 2 are symmetrically disposed on either side of the shaft of the wheel 1. Each distributing disc 2 is rotatably mounted on a shaft (not shown), the shafts of the two discs 2 being perpendicular to the shaft of the wheel 1. Each disc 2 has two slots 5 which are symmetrically disposed on either side of the axis of the disc. The slots 5 extend inwardly from the rim of the disc 1 towards the center of the disc.

The walls of the slots 5 may form any desired angle with the faces of the disc.

The housing 3 supports the shafts of the main wheel 1, of the distributing discs and 2 of the connecting members (not shown). As shown in FIGS. 5 and 6, the housing 3 surrounds as closely as possible the volume generated by rotation of the fins 4, the wheel 1 and the discs 2 about their respective shafts. The housing contains two inlet apertures 6 and two outlet apertures 7, the apertures 6 and 7 having the shape of a sector of a circular ring. Each inlet aperture 6 is placed to the rear of a distributing disc 2 in the direction of rotation of the wheel, and each outlet aperture 7 is placed in front of an associated disc. The apertures 6 and 7 are located on the portions of the housing 3 adjoining the lateral edges of the fins 4, the inlets 6 being located on one side of the housing 3 and the outlets 7 on the other side.

The connecting members between the shafts of the disc 2 and of the wheel 1 are not shown and may be formed by any conventional transmission device.

As shown in FIG. 8, the external surface of each distributing discs 2 is geometrically tangential, at at least one arc, to the rim of the main wheel 1, and the external surface of the volume generated by revolution of the fins 4 (the volume being indicated by broken lines) is geometrically tangential, at at least one arc, to the internal surface of the volume generated by rotation of the slots 5 in the distributing discs 2.

The arrangement of the slots 5 and fins 4, the shapes thereof and the relative movement of the main wheel and of the distributing discs are such that the portions common to the volumes generated by rotation of the fins and of the slots are fully occupied, constantly or not, by part of a fin or part of a distributing disc or part of both, so that there is always a solid impermeable barrier between the two sides, upstream and downstream relative to each distributing disc, in the volume swept by the fins. The relation between a fin 4 and a distributing disc 2 is therefore in the manner of a gearing connection and is desirably in the manner of a helical gearing, the word "connection" of course being understood in its geometrical sense rather than its mechanical sense since the drive both for the fin and for the distributing disc is external. With the construction described there is no direct communication at any time between the inlet aperture and the outlet aperture located on each side of each distributing disc.

Similarly there is no direct communication between the inlet and outlet located between two distributing discs, since a fin 4 will not expose one of the apertures until the other fin has covered the preceding one.

Since the housing is itself shaped so as to surround the rim or any other part of the wheel 1, such as its shaft, and the volume generated by rotation of the fins 4 as closely as possible, there is an impermeable barrier to fluids between the portions upstream and downstream of the housing relative to opposite sides of the housing and relative to each distributing disc.

The rotational movements of the fins and distributing discs are synchronized so that the discs allow free passage to the fins, the latter passing through the slots in the discs and engaging therewith as a function of the gearing geometry mentioned above.

The apparatus according to the invention may operate as a suction and force pump. In this case the shaft of the main wheel 1 drives said wheel 1 and thereby the fins 4 in rotation. A fin 4 which has just cleared a distributing disc 2 reaches and passes beyond the inlet aperture located immediately after the disc. As the fin moves away from the disc the volume defined by the housing, the rim of the wheel, the distributing disc and the fin is increased. As this volume is in contact with the outside only through the inlet aperture a vacuum is produced and external fluids are sucked in (FIG. 7).

As the outlet aperture is exposed by a fin when the following fin simultaneously covers the inlet aperture, fluids located in front of a fin are subjected to pressure and evacuated through the outlet aperture.

The two operations of suction and delivery are thus simultaneous.

The apparatus according to the invention can obviously operate also as a turbine. In this case the fluids in motion or under pressure pass through the inlet aperture and, acting on the fin, drive it until they are themselves forced through the outlet aperture by the following fin. The moment this escape begins the following fin reaches or covers the inlet aperture through which the fluids have passed, and the cycle recommences.

In the two types of operation, as a pump and as a turbine, the inlets and outlets are opened and closed substantially instantaneously, for they are diametrically opposed and lie between radial lines extending from the center of the wheel 1.

Suction (or inflow) and delivery (or outflow) are continuous or discontinuous independently of one another, according to whether or not the surfaces of the sides of the fins completely cover the respective apertures which are of independent dimensions.

In other words, on outflow of the fluids evacuation of a volume bounded by two fins ends before that of the following volume starts in a case where the surface of the side of the fin is at least equal to the section of the output aperture; otherwise evacuation of a volume starts before that of the preceding volume. On inflow of the fluids admission is interrupted in the case where the surface of the side of the fin is at least equal to the section of the input aperture and is not interrupted otherwise.

These properties, on inflow and outflow, are independent assuming that the sections of the respective apertures are themselves independent.

Moreover, the geometry of the system is such that the volume between two fins is never closed but always communicates with two input and output apertures and such that there is no residual volume either on admission or delivery.

Although the wheel 1 of the apparatus illustrated in the accompanying drawings has only two fins it may obviously be provided with any number of these provided that a corresponding number of distributing discs, and input and output apertures are used, each input aperture and each output aperture being located at each side of each disc.

The angle between the rotational axes of the distributing discs and the rotational axis of the finned wheel may have any value.

The effectiveness of the seal between the various members against fluid leakage and the effectiveness of the barriers provided by the discs of the fins, may be imperfect chiefly as a result of large manufacturing clearances, therefore clearances should be a minimum.

The relation between the rotation of the finned wheel and of the distributing disc or discs is a function of the number of slots in each disc.

The diameters of the finned wheel and the distributing disc or discs are independent, and a plurality of main wheels of several pieces of apparatus may be mounted on one and the same shaft.

A non-restrictive example of the application of the apparatus according to the invention will be described with reference to FIG. 9. Therein is shown a turbine comprising four pieces of apparatus acording to the invention forming two groups which are fixed on two different aligned shafts.

The first group comprises two pieces of apparatus of which the first 10 acts as a compressor and the other 11 as a turbine driving said compressor. The second group comprises two pieces of apparatus 12 and 13 for filling the function of motive turbines.

Each apparatus has a main wheel with two fins and two distributing discs, each disc having two slots. The main wheel and the distributing discs in each apparatus rotate at the same angular speed. The axis of each disc and the aligned axes of the main wheels are perpendicular.

The apertures providing an inlet to the first apparatus 10 in the form of a compressor are connected to an inlet orifice 14 through which air enters. When the air has been compressed it leaves through outlet apertures in said compressor and enters two combustion chambers 15 where fuel 16 is injected and ignited by any suitable means 17, 18. Each of the combustion chambers is connected to the inlet apertures of the turbine 11 for driving the compressor, and the gases resulting from combustion drive the fins of said turbine. The volume swept by the fins of the turbine is greater than that swept by the fins of the compressor.

On leaving the driving turbine 11 the gases are directed to the two turbines 12 and 13, each outlet aperture of the driving turbine 11 being connected to an inlet aperture in each of the motive turbines. On leaving the turbines the gases escape into the atmosphere 19. Two valves 20 enable each or both turbines to be brought into or out of operation at will.

The energy thus converted is available as rotational energy of the shaft of the two turbines 12 and 13.

I claim:
1. Apparatus which can be used as a reversible pump, a compressor or a volumetric motor, comprising a wheel rotatable about a predetermined axis, at least one fin mounted on the wheel at the periphery thereof; at least one disc mounted for rotation about an axis inclined with respect to the axis of rotation of said wheel; said discs being equal in number to the fins, each disc having slots in which engage respective fins during the rotation of said wheel; a stationary housing which envelops, in fluid-tight manner, the volume generated by the wheel, the fins and the discs by their rotation about their respective axes; said housing having one inlet orifice and one delivery orifice for each disc, arranged respectively, on each side of said wheel and on each side of a respective disc; said wheel and said slots of said discs being of complementary shape, so that each said fin completely closes its associated slot when said fin is engaged inside said slot; the rotational speeds of said disc and of said wheel being such that each pair of inlet and outlet orifices are constantly separated in fluid-tight manner by the associated disc and said fins.

2. Apparatus according to claim 1, wherein said fins and slots of said disc interengage in the manner of gear engagement.

3. Apparatus according to claim 1, wherein said inlet orifices are disposed immediately ahead of the associated discs, in the direction of rotation of said wheel, and said outlet orifices are located immediately behind the associated discs.

4. Apparatus according to claim 1, wherein said inlet orifices and said outlet orifices have the shape of circular ring sectors.

5. Apparatus according to claim 1, wherein said wheel and said discs are adapted for mounting on separate shafts which can be coupled to the same mechanical system outside said housing.

References Cited by the Examiner

UNITED STATES PATENTS

| | | | |
|---|---|---|---|
| 1,305,133 | 5/1919 | Little | 91—85 |
| 1,704,254 | 3/1929 | Jaffe | 123—13 |
| 3,205,874 | 9/1965 | Renshaw | 230—150 |

MARTIN P. SCHWADRON, *Primary Examiner.*

WILBUR J. GOODLIN, *Examiner.*